(12) United States Patent
Wang et al.

(10) Patent No.: US 10,499,081 B1
(45) Date of Patent: Dec. 3, 2019

(54) NEURAL NETWORK POWERED CODEC

(71) Applicant: Sony Interactive Entertainment Inc., Tokyo (JP)

(72) Inventors: Jason N. Wang, Pleasanton, CA (US); Eric Hsuming Chen, Saratoga, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/012,570

(22) Filed: Jun. 19, 2018

(51) Int. Cl.
| *H04N 19/593* | (2014.01) |
| *H04N 19/436* | (2014.01) |
| *H04N 19/60* | (2014.01) |
| *H04N 19/563* | (2014.01) |
| *H04N 19/107* | (2014.01) |
| *H04N 19/523* | (2014.01) |
| *H04L 29/06* | (2006.01) |

(52) U.S. Cl.
CPC ......... *H04N 19/593* (2014.11); *H04L 65/607* (2013.01); *H04N 19/107* (2014.11); *H04N 19/436* (2014.11); *H04N 19/523* (2014.11); *H04N 19/563* (2014.11)

(58) Field of Classification Search
CPC .... H04N 19/13; H04N 19/137; H04N 19/159; H04N 19/169; H04N 19/174; H04N 19/189; H04N 19/192; H04N 19/463; H04N 19/90
USPC .................................................... 375/240.16
See application file for complete search history.

(56) References Cited

U.S. PATENT DOCUMENTS

| 8,218,641 | B2 | 7/2012 | Wang | |
| 8,711,933 | B2 | 4/2014 | Lee | |
| 8,749,409 | B2 | 6/2014 | Xu | |
| 8,819,525 | B1 | 8/2014 | Holmer | |
| 2017/0264902 | A1 | 9/2017 | Ye et al. | |
| 2018/0165576 | A1* | 6/2018 | Latapie | ................... G06N 3/08 |

(Continued)

OTHER PUBLICATIONS

Gil Keren et al,, "Convolutional RNN: an Enhanced Model for Extracting Features from Sequential Data", arXiv:1602.05875, Feb. 18, 2016.

(Continued)

*Primary Examiner* — Dominic D Saltarelli
(74) *Attorney, Agent, or Firm* — JDI Patent; Joshua Isenberg; Robert Pullman (57) ABSTRACT

Training a video decoder system comprising, generating at least two sets of video encoding parameters wherein the at least two sets of video encoding parameters are valid, masking a set of the at least two sets of encoding parameters with invalid values to generate an invalid set of video encoding parameters, providing a set of the at least two sets of video encoding parameters to a neural network, training the neural network to predict valid video encoding parameter values for the invalid set using an iterative training algorithm, determining which encoding parameters need to be encoded based on analysis of a prediction error of the trained recurrent neural network, dropping the encoding parameters from the encoded data which are determined to be accurately predicted by the trained recurrent neural network, encoding a new video stream without the dropped encoding parameters. A coder and decoder system with neural network is also disclosed.

27 Claims, 6 Drawing Sheets

(56) References Cited

U.S. PATENT DOCUMENTS

2018/0174047 A1\* 6/2018 Bourdev .............. H04N 19/126
2018/0227585 A1\* 8/2018 Wang ................... H04N 19/176
2019/0132591 A1\* 5/2019 Zhang .................. H04N 19/124

OTHER PUBLICATIONS

Liu et al., "A Recursive Recurrent Neural Network for Statistical Machine Translation", ACL, 2014.
Sepp Hochreiter et al., "Long Short-Term Memory", Neural Computation, 9(8) 1735-1780, 1997, Cambridge, MA.
Tomas Mikolov et al., "Recurrent neural network based language model", Interspeech 2010, 11th Annual Conference of the International Speech Communication Association, Makuhari, Chiba, Japan, Sep. 26-30, 2010.
International Search Report and Written Opinion dated Sep. 18, 2019 for International Patent Application No. PCT/US2019/036589.

\* cited by examiner

NEURAL NETWORK POWERED CODEC

FIELD OF THE INVENTION

The present disclosure relates to encoding and decoding video streams. More specifically the present disclosure is related to encoding and decoding a video stream using neural networks.

BACKGROUND OF THE INVENTION

Digital signal compression is widely used in many multimedia applications and devices. Digital signal compression using a coder/decoder (codec) allows streaming media, such as audio or video signals to be transmitted over the Internet or stored on compact discs. A number of different standards of digital video compression have emerged, including H.261, H.263; DV; MPEG-1, MPEG-2, MPEG-4, VC1; and AVC (H.264). These standards, as well as other video compression technologies, seek to efficiently represent a video frame picture by eliminating or reducing spatial and temporal redundancies within a given picture and/or among successive pictures. Through the use of such compression standards, video contents can be carried in highly compressed video bit streams, and thus efficiently stored in disks or transmitted over networks.

Many codecs make use of different types of coding of frames. Examples of different frame coding formats include Intra-coded frames (I-frames), predictive coded frames (P-frames) and bi-predictive coded frames (B-frames). In general terms, an I-frame is coded without reference to any other frame. An I-frame can be decoded independent of the decoding of any other frames. I-frames may be generated by an encoder to create a random access point that allows a decoder to start decoding properly at the location of the I-frame. I-frames generally require more bits to encode than P-frames or B-frames.

P-frames are coded with reference to one or more other frames, such as an I-frame or another P-frame. A P-frame contains changes in the image from one or more previous frames. Decoding a P-frame requires the previous decoding of one or more other frames. P-frames require fewer bits to encode than I-frames. B-frames are similar to P-frames but contain image differences with respect to both previous and subsequent frames. B-frames can be coded in some prediction modes that form a prediction of a motion region within the frame by averaging the predictions obtained using two different previously-decoded reference regions. B-frames require fewer bits to encode than I-frames or P-frames.

The coding of video streams into bitstreams that contain I-frames for transmission over the Internet is subject to certain problems. One problem is compression delay. Even though an I-frame typically requires more bits than a P-frame or B-frame it takes more time to compress and encode a video image as a P-frame or B-frame than as an I-frame. Another problem is referred to as bit-rate jitter. Because I-frames consume much more bit counts than P-frames or B-frames, the bit rate for producing encoded pictures is uneven. Additionally for each section several different parameters must be encoded within the video stream to enable proper decoding. These parameters are additional bits that must be added to the encoded video stream and thus increase the size of the encoded bit stream. It would be more desirable to have a smaller bit stream and a thus a smoother bit rate.

A field of recent development that has had an impact on a wide range of other fields is neural networks (NN). Neural networks have been applied successfully in a myriad of fields including image recognition, voice recognition and handwriting recognition as well as stock market prediction. A neural network at its simplest level is a series of nodes with transition weights and internal biases. An input, referred to as a feature, is provided to the neural net. When the neural network is being trained the input will have a desired result, called a label. To train the neural network to produce the correct label for the feature the weights are adjusted using a cost function over numerous attempts until the label is given correctly for the particular feature. A common type of neural network used in applications such as image recognition and stock market prediction is the recurrent neural network (RNN). The RNN adds a second output to the typical node network design; this second output may simply be a repetition of the node itself. The second output represents an added memory component which allows the network to maintain unbounded history information about the features and related labels. This repetition may be thought of as an additional hidden node layer which has the same transition weights and biases as the previous layer.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Introduction

Embodiments of the present invention implement a new encoding protocol which includes the use of one or more trained neural networks to reduce the amount of information that is included within the encoded bit stream. The trained neural network may allow the codec to predict encoding parameters from previous encoding parameters. Thus according to aspects of the present disclosure encoding parameters that are accurately predicted by the neural network may not be encoded and incorrectly predicted parameters may be corrected by an encoding error stream encoded within the bit stream.

The proposed protocol uses first and second neural networks. Both the first and second neural networks are capable of predicting encoding parameters using other encoding parameters as inputs. However, the input of the first neural network (NN) is different from that of the second NN.

To better appreciate certain aspects of the present disclosure it is useful clarify some terms before discussing the inputs of the first and the second NN. A conventional video encoder can compress a video sequence into a coded stream. In the coded stream, the original input video pixels are represented by a sequence of encoded parameters, such as MB type, intra prediction type, motion vector and DCT coefficient. A time concept can be used to describe the order between parameters. Specifically, if parameter A is placed closer to the beginning of the video sequence than parameter B, parameter A is said to be before parameter B. Otherwise, parameter A is said to be after parameter B.

For the first NN, the input includes both parameters before and after the current parameter to be predicted. For the second NN, the input only has parameters before the current parameter to be predicted. This is similar to a predictive (P) picture and bi-predictive (B) picture in a coded video stream. A P picture only uses reference pictures before the current picture. A B picture uses reference pictures both before and after the current picture. Because the first NN receives input from both before and after the current parameter that is to be predicted, the prediction result of the first NN is better than that of the second NN. But, similar to B picture prediction, because the first NN depends on future parameters as inputs, the usage of the first NN is limited by availability of future parameters.

Both the first NN and the second NN could be used to improve video coding efficiency by predicting coded parameters. Because only earlier parameters are expected as the input, the input is always available for the second NN without reordering the original coded video stream. But, to enable first NN prediction, some future parameters must be available before the first NN starts prediction. Just as a P picture must be available as a reference for a B picture, the prediction result of the second NN could be used as the input of the first NN. But, the output of the first NN cannot be used as the input of the second NN. For convenience, it is useful herein to refer a neural network like the first NN as being "bi-predictive" and to refer to a neural network like the second NN as being "predictive".

If both the first NN and the second NN are used together, some parameters could be predicted by the first NN and some parameters could be predicted by the second NN. No parameter is predicted by both. Similarly some pictures are coded as P picture and some pictures are coded as B picture, but, no picture is coded as both P and B.

In general, too many second NN predictions decreases the prediction accuracy. Too many first NN predictions decreases the number of available input parameters of both first and second NN and could also decrease the prediction accuracy. It is important to find out an optimal combination of first and second NN to achieve the best overall prediction accuracy. For example, the second NN could predict DCT coefficients. Then, both before and after DCT coefficients will be available to the first NN for other parameter predictions. Please note that the first NN can only use available parameters as inputs. Even if all DCT coefficients are available, not all future parameters are necessarily available. For example, when MB coding type of MB1 is the prediction target of the first NN, MB coding type of MB0 is available but MB code type of MB2 is not available. However, the DCT coefficients of MB2 are available. In one implementation, the same data set format is prepared for both first NN and second NN. According to parameter availability, non-available parameters are masked out with special invalid values. After prediction, the prediction error will be entropy compressed as the final encoding result. To make the decoding process smoother, the prediction error may be reordered before it is stored or transmitted. With each picture as one unit, the prediction error of the second NN may be stored or transmitted first, and then the prediction error of the first NN may be stored or transmitted. On the decoder side, the second NN is executed before the first NN.

To facilitate understanding in light of existing video encoding methods, even if the final encoded stream order is different from a conventional encoder output order, the present disclosure still uses the conventional encoder output order to specify "before" and "after" relationships between encoding parameters.

Figure 1A:
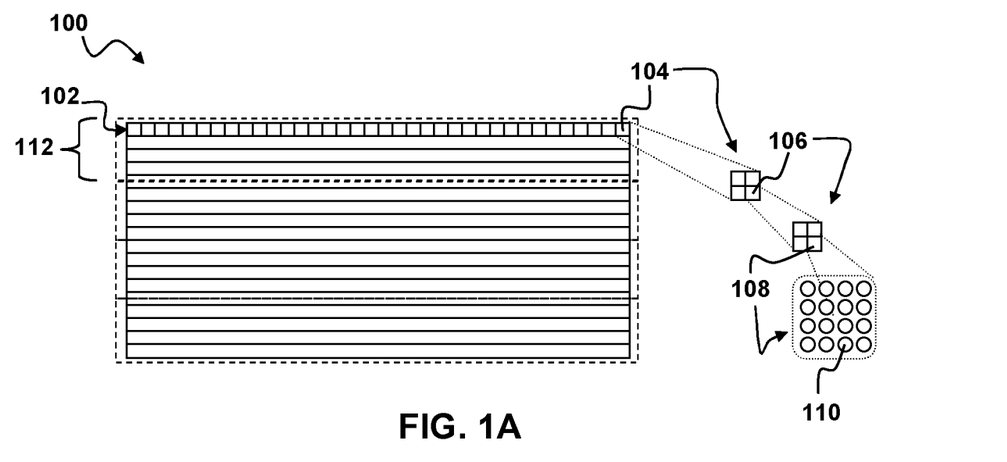
FIG. 1A is a schematic diagram illustrating one possible division of a streaming data picture within the context of embodiments of the present invention.

To better understand the terminology regarding picture encoding the segmentation of screen space will be discussed with respect to FIG. 1A. FIG. 1A, depicts a single picture 100 (e.g., a digital video frame) may be broken down into one or more sections. As used herein, the term "section" can refer to a group of one or more pixels within the picture 100. A section can range from a single pixel within the picture, up to the whole picture. Non-limiting examples of sections include slices 102, macroblocks 104, sub-macroblocks 106, blocks 108 and individual pixels 110. As illustrated in FIG. 1A, each slice 102 contains one or more rows of macroblocks 104 or portions of one or more such rows. The number of macroblocks in a row depends on the size of the macroblocks and the size and resolution of the picture 100. For example, if each macroblock contains sixteen by sixteen pixels then the number of macroblocks in each row may be determined by dividing the width of the picture 100 (in pixels) by sixteen. Each macroblock 104 may be broken down into a number of sub-macroblocks 106. Each sub-macroblock 106 may be broken down into a number of blocks 108 and each block may contain a number of pixels 110. By way of example, and without limitation of the invention, in a common video coding scheme, each macroblock 104 may be broken down into four sub-macroblocks 106. Each sub-macroblock may be broken down into four blocks 108 and each block may contain a four by four arrangement of sixteen pixels 110.

The Neural Network Enhanced Encoding

According to aspects of the present disclosure the inclusion of encoding parameters e.g., motion vectors, intra prediction mode motion vectors and transform coefficients may be reduced through the use of a neural network trained predict the encoding parameters of a next frame from the encoding parameters of the current frame and/or previous frames and/or encoding parameters of the current frame could be predicted from other encoding parameters of the current frame. The encoding system may carry out an encoding scheme for a current section that derives encoding parameters through standard means as detailed below, the encoding parameters may then be provided to a neural network trained to predict the next set of encoding parameters from the current set of encoding parameters (hereinafter referred to as the second NN). The system may then derive the encoding parameters for the next section of the un-encoded video stream and check the results of the prediction of the encoding parameters for the next section made by the NN. If the prediction was accurate the system will not include the encoding parameters in the coded bit stream. If the prediction was not accurate the system may include the encoding parameter in the bit stream. In some embodiments the difference between the encoding parameter predicted by the neural network and the actual encoding parameter derived by the standard encoding process (hereinafter referred to as the encoding error) is included in the coded bitstream when the prediction is not accurate. In this way a reduced set of encoding parameters may be included within the coded bitstream and thus the memory footprint of a video stream may be reduced.

According to additional aspects of the present disclosure another neural network (hereinafter referred to as the first NN because in the training process this neural network may be trained first) trained to predict the encoding parameters for a current section from parameter values for a previous section and a next section may be provided for additional accuracy. The previous and next section encoding parameters used as inputs for the first NN may be generated from the results of the second NN plus the encoding error. The first neural network may then predict missing parameter values for the current section from the set of previous and next section parameter values generated by the second NN. As described above with respect to the second NN, the result of this prediction may be compared with the actual encoding parameters of the next section derived from the encoding process. If the encoding parameters that were predicted by the first NN are correct then they may be dropped from the coded bitstream and as before if the predicted parameter values are incorrect then the actual encoding parameters will be included in the coded bit stream or alternatively the encoding error will be included.

The neural network may be any type known in the art but preferably the neural network is a Recurrent Neural Network (RNN). The RNN may be a convolutional RNN (CRNN). In an alternative embodiment the RNN is a long short term memory (LSTM) RNN of any type.

Figure 1B:
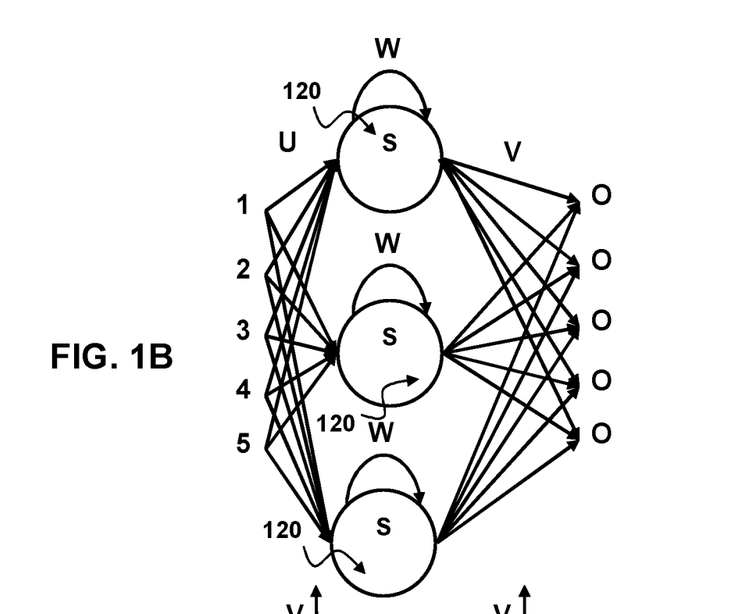
FIG. 1B is a schematic diagram illustrating one possible node layout for a recurrent neural network according to aspects of the present disclosure.
Figure 1C:
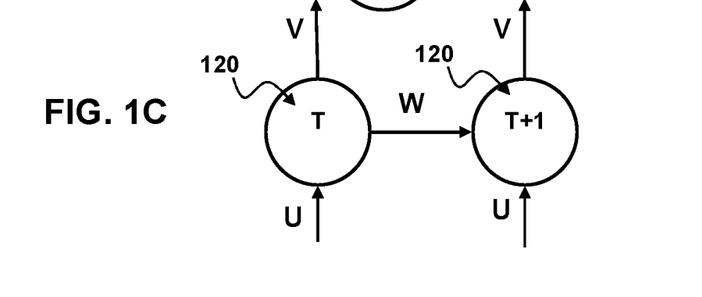
FIG. 1C is a schematic diagram illustrating an unrolled recurrent neural network according to aspects of the present disclosure

FIG. 1B depicts a The Basic form of an RNN is a layer of nodes 120 having an activation function S, one input weight U, a recurrent hidden node transition weight W, and output transition weight V. It should be noted that the activation function may be any non-linear function known in the art and is not limited to the Tan h function, for example the activation function S may be a Sigmoid or ReLu function. Unlike other types of neural networks RNNs have one set of activation functions and weights for the entire layer. As shown in FIG. 1C the RNN may be considered as a series of nodes 120 which have the same activation function moving through time T and T+1. Thus the RNN maintains historical information by feeding the result from a previous time T to a current time T+1. In some embodiments a convolutional RNN may be used. A convolutional RNN will have several different node layers connected, with the outputs of a first node layers connected to the input of a second node layer and so on, forming a hierarchical structure. Another type of RNN that maybe used is a LSTM Neural Network which adds a memory block in a RNN node with input gate activation function, output gate activation function and forget gate activation function resulting in a gating memory that allows the network to retain some information for a longer period of time as described by Hochreiter & Schmidhuber "Long Short-term memory" Neural Computation 9(8):1735-1780 (1997).

Training the Neural Network

Figure 2:
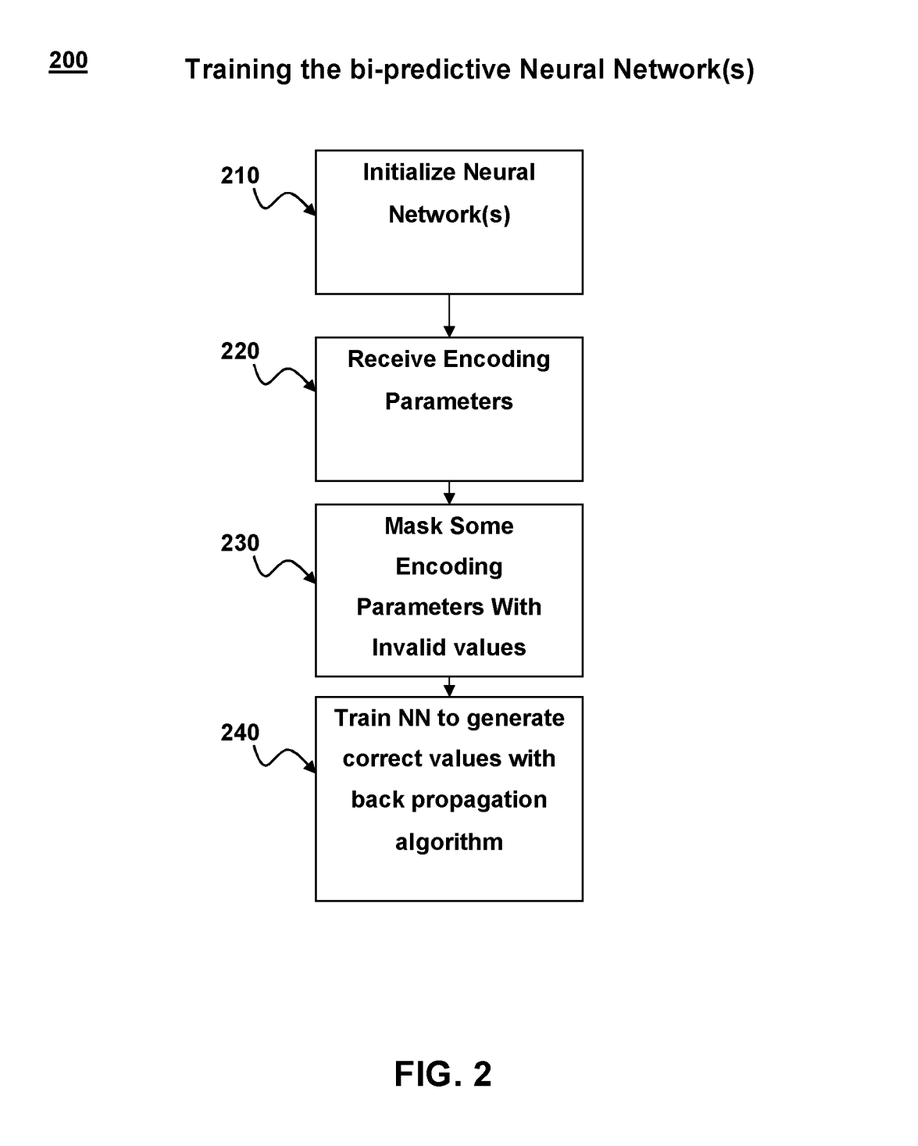
FIG. 2 is a block diagram depicting the method for training a bi-predictive neural network according to aspects of the present disclosure.

FIG. 2 depicts the method 200 for training a new neural network to recognize and correctly predict encoding parameters. Training the neural network (NN) begins with initialization of the weights of the NN 210. The initial weights depend on the type of activation function and number of inputs to the node. The initial weights for an NN cannot be 0 because that would result in asymmetric calculations in the hidden layers. In general the initial weights should be distributed randomly. For example an NN with a tan h activation function should have random values distributed between $$-\frac{1}{\sqrt{n}}$$

and $$\frac{1}{\sqrt{n}}$$

where n is the number of inputs to the node.

The NN may have any number of states. In a general NN each hidden state is provided every feature as its input and produces an output as large as the label space. In a CRNN the label space is reduced by the addition of extra node layers with a reduced number of nodes compared to the previous layer. In some embodiments the label space for encoding parameter values is a 4 bit small unsigned integer plus a sign bit. For parameter values large than 4 bits the parameter may be encoded in the stream directly without prediction.

Once the NN has been initialized with random values it may be trained with feature data. It should be noted that the form of the training data for both neural net types should closely match the form of the data that will be sent and received when the system is actually performing encoding/decoding functions. This is particularly the case when the same NN is used by the encoder and decoder. In such cases, the decoder side NN is expected to output the same result as the encoder side NN. According to aspects of the present disclosure a first NN may be trained to predict correct encoding parameters from a previous section and a next section's encoding parameters.

To train the first NN to predict encoding parameters for a current section from a previous and next section, arrays of video encoding parameters must be created 220. Each array includes encoding parameters for each section of a video stream arranged by time stamp from the previous section up to a future section. These arrays may be generated by the encoding parameter generation method described above. The feature data for the first NN contains labels for each section in the video stream up to the next section and therefore at least one type of encoding parameter for the current section must be masked with invalid values 230. In some instances not every encoding parameter for a bitstream may be available; in this case, all future encoding parameters past the next section are masked with invalid values. The first NN is then provided with the encoding parameter array including the masked encoding parameters as feature data. The labels predicted by the NN for the masked array are compared to the actual encoding parameters and the NN is trained with a standard backpropagation algorithm with stochastic gradient descent 240.

After each round of training 240 a different encoding parameter type may be masked and the previously masked parameter may be unmasked. In this way the first NN may be trained to recognize and predict every type of encoding parameter for a current section from the parameters of the previous and next sections. Similarly the first NN may be trained to predict a missing parameter value of a current section from other parameter values of the current section and/or a previous and next section It should be understood that multiple encoding parameters for a current section may be masked or all parameters for the current section may be masked during the course of training. Additionally in some embodiments during training the next section may have the encoding parameters of the type to be predicted, masked. Training of the first NN will cease after there is no longer an improvement in the error rate of prediction. In some embodiments an output token may replace actual parameter values.

From an examination of node input, output, and transition weights of the first NN it can be determined which encoding parameters can be predicted accurately using the other encoding parameters. Furthermore meta-analysis of the weights and biases of the NN may be used to determine the importance of an encoding parameter type in prediction of other encoding parameter types.

Figure 3:
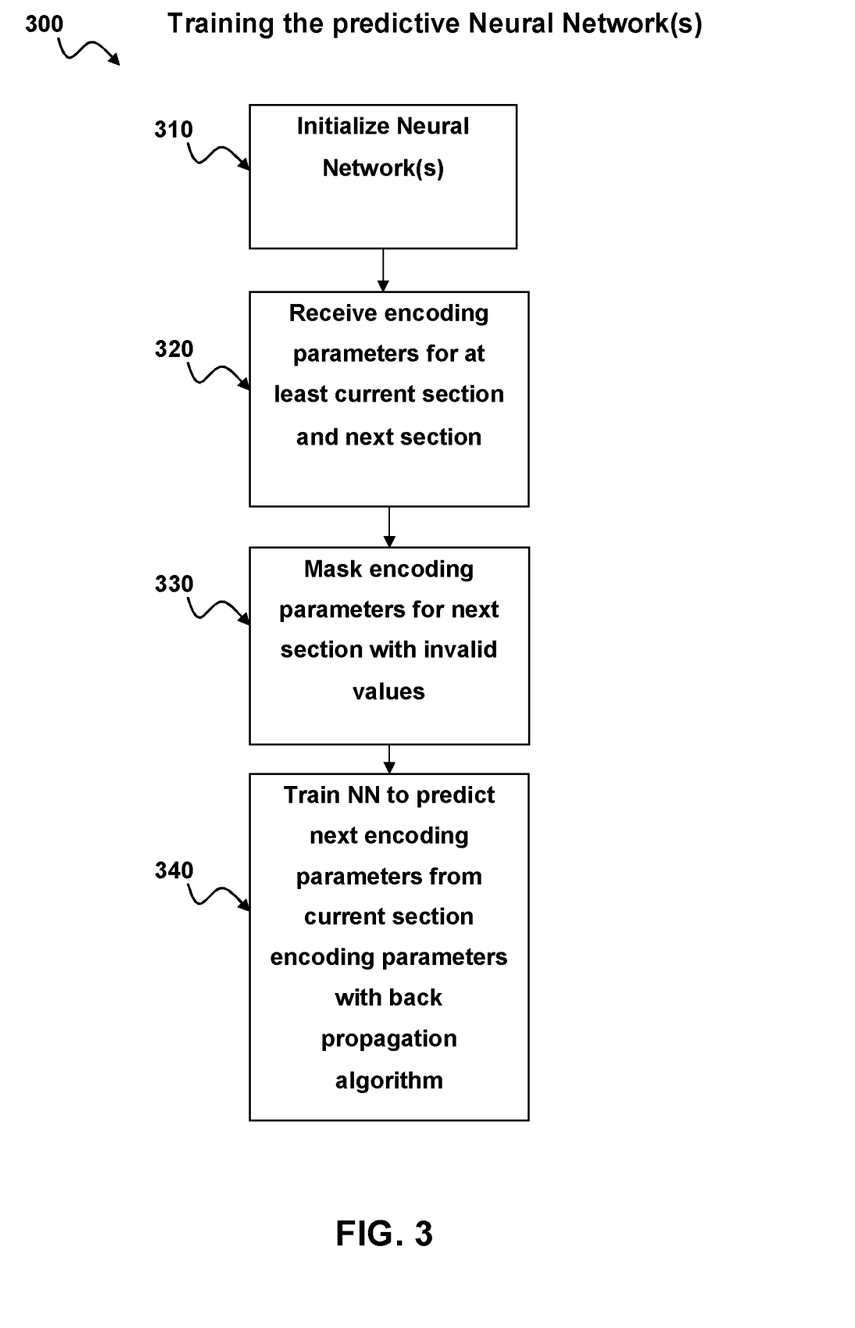
FIG. 3 is a block diagram depicting the method for training a predictive neural network according to aspects of the present disclosure.

FIG. 3 depicts a method for training a second NN. Similar to the first NN, the second NN may be trained to predict the encoding parameters of a next section using back propagation with stochastic gradient descent according to the method 300. The second neural network is first initialized with random values 310 in the same way as discussed with FIG. 2 above. The second neural network is provided with an array containing each type of encoding parameter for each section up to a current section 320. The next section of the array of encoding parameters may be masked invalid values 330 and the array of invalid values may be provided to the neural network. The correct label is the encoding parameters for the next section which is known from the encoding parameter generation method as described below. Backpropagation through time with stochastic gradient descent is used to develop the correct weights and biases for the second neural network 340. Several iterations of training are performed until there is no longer a reduction in the error rate of prediction. After training the NN will produce valid encoding parameters for the next section.

The Neural Network Encoding Method

Figure 4:
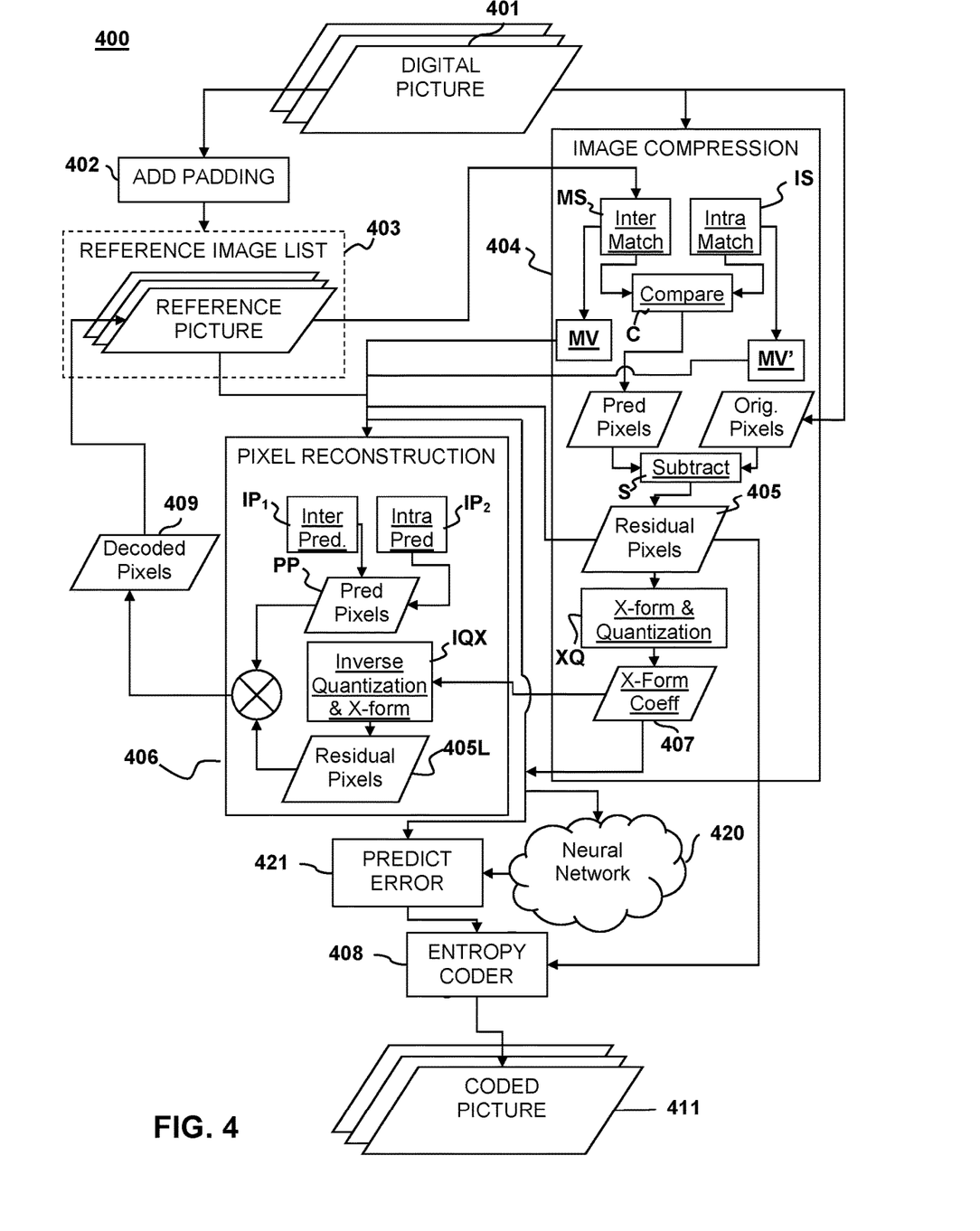
FIG. 4 is a flow diagram illustrating a neural network enhanced digital picture encoding that may be used in conjunction with embodiments of the present invention.

Digital pictures may be encoded according to a generalized method 400 as illustrated in FIG. 4. The encoder receives a plurality of digital images 401 and encodes each image. Encoding of the digital picture 401 may proceed on a section-by-section basis. The encoding process for each section may optionally involve padding 402, image compression 404 and pixel reconstruction 406. To facilitate a common process flow for both intra-coded and inter-coded pictures, all un-decoded pixels within a currently processing picture 401 are padded with temporary pixel values to produce a padded picture, as indicated at 402. The padded picture is added to a list of reference pictures 403 stored in a buffer. Padding the picture at 402 facilitates the use of the currently-processing picture as a reference picture in subsequent processing during image compression 404 and pixel reconstruction 406. Such padding is described in detail in commonly-assigned U.S. Pat. No. 8,218,641, which is incorporated herein by reference.

As used herein, image compression refers to the application of data compression to digital images. The objective of the image compression 404 is to reduce redundancy of the image data for a give image 401 in order to be able to store or transmit the data for that image in an efficient form of compressed data. The image compression 404 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 401 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression 404 may include region of interest coding in which certain parts of the image 401 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 404 the encoder may search for the best way to compress a block of pixels. The encoder can search all of the reference pictures in the reference picture list 403, including the currently padded picture, for a good match. If the current picture is coded as an intra picture, only the padded picture is available in the reference list. The image compression at 404 produces a motion vector MV and transform coefficients 407 that are subsequently used along with one or more of the reference pictures (including the padded picture) during pixel reconstruction at 206.

The image compression 404 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 405. The residual pixels then undergo a transform and quantization XQ to produce transform coefficients 407. The transform is typically based on a Fourier transform, such as a discrete cosine transform (DCT). For existing video standards, if an intra picture is to be coded, the motion search MS and inter/intra comparison C are turned off. However, in some embodiments of the present invention, if the padded picture is available as a reference, these functions are not turned off. Consequently, the image compression 204 may be the same for intra-coded pictures and inter-coded pictures.

The motion search MS may generate a motion vector MV by searching the picture 401 for a best matching block or macroblock for motion compensation as is normally done for an inter-coded picture. If the current picture 401 is an intra-coded picture, codecs typically do not allow prediction across pictures. Instead all motion compensation is normally turned off for an intra picture and the picture coded by generating transform coefficients and performing pixel prediction. In some alternative implementations, however, an intra picture may be used to do inter prediction by matching a section in the current picture to another offset section within that same picture. The offset between the two sections may be coded as a motion vector MV' that can be used that for pixel reconstruction at 406. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do pixel reconstruction at 406. However, these functions are conventionally turned off for encoding of intra pictures. In some alternative implementations, the codec may be instructed not to turn off such "inter" picture functions for encoding of intra pictures.

As used herein, pixel reconstruction refers to a technique for describing a picture in terms of the transformation of a reference image to a currently processing image. The output of the pixel reconstruction 406 is sometimes referred to as "decoded pixels". In general, the pixel reconstruction 406 acts as a local decoder within the encoder implementing the encoding process 400. Specifically, the pixel reconstruction 406 includes inter prediction $IP_1$ and (optionally) intra prediction $IP_2$ to get predicted pixels PP using the motion vector MV or MV' from the image compression 404 and reference pixels from a picture in the reference list. Inverse quantization and inverse transformation IQX using the transform coefficients 407 from the image compression 404 produce lossy residual pixels 405L which are added to the predicted pixels PP to generate decoded pixels 409. The decoded pixels 409 are inserted into the reference picture and are available for use in image compression 404 and pixel reconstruction 406 for a subsequent section of the currently-processing picture 401. After the decoded pixels have been inserted, un-decoded pixels in the reference picture may undergo padding 402

By way of example, and not by way of limitation, in one type of motion compensation, known as block motion compensation (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. This shift is represented by a motion vector MV. To exploit the redundancy between neighboring block vectors, (e.g. for a single moving object covered by multiple blocks) it is common to encode only the difference between a current and previous motion vector in a bit-stream. The result of this differencing process is mathematically equivalent to a global motion compensation capable of panning. Further down the encoding pipeline, the method 400 may optionally use entropy coding 408 to take advantage of the resulting statistical distribution of the motion vectors around the zero vector to reduce the output size.

Block motion compensation divides up a currently encoding image into non-overlapping blocks, and computes a motion compensation vector that indicates where those blocks come from in a reference image. The reference blocks typically overlap in the source frame. Some video compression algorithms assemble the current image out of pieces of several different reference images in the reference image list 403. More information about coding and decoding methods can be found in commonly owned U.S. Pat. No. 8,711,933 which is incorporated herein by reference.

According to aspects of the present disclosure the motion vector MV, (and/or intra prediction mode motion vector MV') and transform coefficients 407, collectively referred to herein as encoding parameters may be provided to the second neural network 420. The second neural network is trained to predict the encoding parameters for the next section from the current section as discussed above. Once a prediction has been made, the predicted encoding parameters the prediction error is determined at 421 by comparing the predicted encoding parameters provided by the neural network 420 to the actual encoding parameters for the next section. By way of example and not by way of limitation the prediction error may be a subtraction of the predicted encoding parameters from the actual encoding parameters for the next section. If the result of the subtraction is zero then the encoding parameter has been accurately predicted. Accurately predicted encoding parameters may be dropped from encoding and will not be included in the coded picture 411 or passed to the entropy encoder 408. If the result of the encoding error determination is a non-zero number, the encoding error may be (optionally) encoded using entropy encoding 408 and included in the coded picture 411. According to alternative aspects of the present disclosure if the result of the encoding error is a non-zero number the correct encoding parameter may be (optionally) encoded with entropy encoding 408 and included in the coded picture 411. By way of example and not by way of limitation the prediction error may be included slice data or in the headers or portions of the headers of the coded pictures 411.

It should be noted that for the first section or several sections the actual encoding parameter may be included in the coded picture 411. Determining the prediction error 421 may include determining whether the section is an initial section or sections of the group of pictures and if it is determined that the section is an initial section or sections of the group of pictures then the encoding parameter for the section may be (optionally) entropy encoded and included in the coded pictures 411 without modification. This allows the neural network included in the decoding system to have a correct starting point for prediction of the encoding parameters. Additionally the initial encoding parameters may include a flag in the header which signals whether the encoding parameters are unaltered initial encoding parameters or a prediction error.

In alternative embodiments of the present disclosure the first neural network is provided the results of the second neural network and (optionally) the prediction error. The first neural network is trained predict missing encoding parameters from encoding parameters of the current section and/or a previous and next section. The first neural network may use the predicted encoding parameters from the second neural network and (optionally) the prediction error to produce a more accurate prediction of the encoding parameters. In some embodiments, to assist in this process the first neural network may also be provided with the actual encoding parameters (determined through the above described process) including both "before" and "after" parameters, as discussed above. Similar to the results of the second neural network, the prediction error may be determined and included in the coded pictures. In alternative embodiments sections of encoded pictures may be flagged for prediction using the first NN. In other alternative embodiments an algorithm may be used to determine which encoding parameters for which section are to be predicted using the first NN, by way of example and not by way of limitation one encoding parameter type may be determined by the first NN while the other encoding parameters are determined by the second NN or every other section may be predicted using the first NN. In some alternative embodiments actual encoding parameters for certain sections may be included in the coded pictures to enable prediction using the first NN. In other alternative implementations, a bi-predictive first NN could be used in a hierarchical fashion. For example, sections 0, 4, 8 . . . may be predicted by the second (predictive) NN. Both sections 0 and 4 may then be used as inputs to the first NN to predict section 2. Then, sections 0 and 2 are used as the input of another bi-predictive neural network to predict section 1. Sections 2 and 4 are used with yet another bi-predictive NN to predict section 3.

The result of the padding 402, image compression 404 and pixel reconstruction 406, prediction error determination 421 and (optional) entropy coding 408 is a coded picture 411.

The Neural Network Enhanced Decoder System

The decoder system uses the second trained NN to predict the correct encoding parameters from a bitstream encoded as discussed above. Initially the encoded bit stream may be decoded with an entropy decoder allowing the parameter values to be extracted from the bit stream. It should be noted that the parameter values for very first section or several sections of the video stream may have all of the video encoding parameters included in the bit stream; this allows the NN to predict the next parameter values for the next section accurately. The encoding parameters may by way of example and not by way of limitation be included coded slice data or in the frame headers for each frame of video in the bit-stream, or in any other suitable location in the bitstream. The encoded bit stream may also include a prediction error stream which may be combined with prediction made by the NN to generate the corrected set of encoding parameters for the next section. The prediction error may, for example, be encoded in to the header information of the pictures.

In an alternative embodiment the second NN generated prediction result plus the prediction error will be used as the input for the first NN. The first NN may use the parameters predicted by the second NN to generate a more accurate prediction of parameters. In general, too many predictions by the second NN will decrease the prediction accuracy. Similarly, too many predictions made by the first NN will decrease the number of available input parameters of both first and second NN and it could also decrease the prediction accuracy. It is important to find out an optimal combination of first and second NN to achieve the best overall prediction accuracy. By way of example and not by way of limitation, the second NN may be used to predict DCT coefficients. Then, both before and after DCT coefficients will be available for other parameter predictions with the first NN. It should be noted that the first NN can only use available parameters as the input. Even if all DCT coefficients are available, not all parameters in the future can be used during prediction. To continue the example, when MB coding type of MB1 is the prediction target of the first NN, MB coding type of MB0 is available but MB code type of MB2 is not available. But, DCT coefficients of MB2 predicted by the second NN are available thus the first NN will use the MB coding type of MB0 and the DCT coefficients of MB2 to predict the MB coding type of MB1. In other alternative embodiments the decoder may receive actual encoding parameters for the next section and use the first NN for prediction of a current section with the received actual encoding parameters for the next section and the previous section's determined parameters. The first NN is "bi-predictive" and the second NN is "predictive", as discussed above. Therefore, the second NN prediction result could be used as an input of the first NN. But, the first NN result cannot be used as the input of the second NN.

According to aspects of the present disclosure the corrected set of encoding parameters may then be used in the decoding process.

Decoding Method

Figure 5:
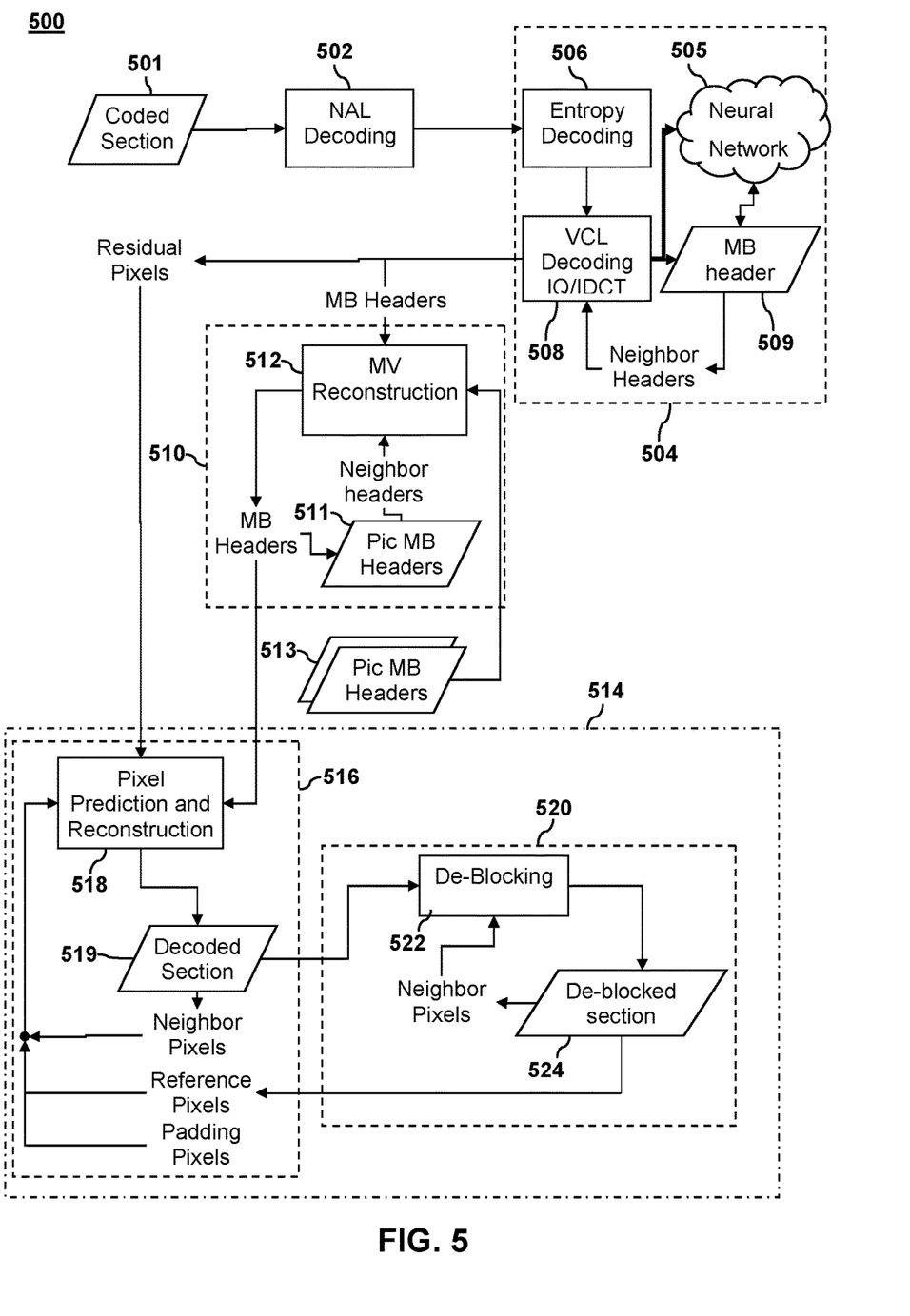
FIG. 5 is a flow diagram illustrating the general process flow in streaming neural network enhanced data decoding that may be used in conjunction with embodiments of the present invention.

FIG. 5 illustrates an example of a possible process flow in a method 500 for decoding of streaming data 501 that may be used in conjunction with embodiments of the present invention. This particular example shows the process flow for video decoding, e.g., using the AVC (H.264) standard. The coded streaming data 501 may initially be stored in a buffer. Where coded streaming data 501 (e.g., a video data bitstream) has been transferred over a network, e.g., the Internet, the data 501 may initially undergo a process referred to as network abstraction layer (NAL) decoding, indicated at 502. NAL decoding may remove from the data 501 information added to assist in transmitting the data. Such information, referred to as a "network wrapper" may identify the data 501 as video data or indicate a beginning or end of a bitstream, bits for alignment of data, and/or metadata about the video data itself. Such metadata may include a bit in a header that identifies a particular coded frame as the first coded frame in a sequence of two or more consecutive successive frames that contain intra-coded subsections that can be used to form a patch frame. The metadata may also include the aforementioned flag in the header which signals whether the encoding parameters are unaltered initial encoding parameters or a prediction error.

In addition, by way of example, the network wrapper may include information about the data 501 including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section.

Due to its complexity, NAL decoding is typically done on a picture and slice level. The smallest NAL buffer used for NAL decoding is usually slice sized. Fortunately, the NAL decoding process 502 involves a relatively low number of cycles. Consequently, the NAL decoding process 502 may be done on a single processor.

In some embodiments, after NAL decoding at 502, the remaining decoding illustrated in FIG. 5 may be implemented in three different thread groups or task groups referred to herein as video coded layer (VCL) decoding 504, motion vector (MV) reconstruction 510 and picture reconstruction 514. The picture reconstruction task group 514 may include pixel prediction and reconstruction 516 and post processing 520. These tasks groups may be chosen based on data dependencies such that each task group may complete its processing of all the macroblocks in a picture (e.g., frame or field) or section before the macroblocks are sent to the next task group for subsequent processing.

Certain codecs may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 504 are typically at the macroblock level for macroblocks within the same slice. Consequently results produced by the VCL decoding process 504 may be buffered at the macroblock level.

VCL decoding 504 often includes a process referred to as Entropy Decoding 506, which is used to decode the VCL syntax. Many codecs, such as AVC (H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC (H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC (H.264) bitstreams. Decoding the entropy layer of AVC (H.264)-coded data streams can be computationally intensive and may present challenges for devices that decode AVC (H.264)-coded bitstreams using general purpose microprocessors. To decode high bit-rate streams targeted by the Blu-ray or the HD-DVD standards, the hardware needs to be very fast and complex, and the overall system cost could be really high. One common solution to this problem is to design special hardware for CABAC decoding. Alternatively, entropy decoding may be implemented in software. An example of a software implementation of entropy decoding may be found in commonly owned U.S. Pat. No. 8,749,409, to Xun Xu, filed Aug. 25, 2006 and entitled "ENTROPY DECODING METHODS AND APPARATUS", which is incorporated herein by reference.

In addition to Entropy Decoding 506, the VCL decoding process 504 may involve inverse quantization (IQ) and/or inverse discrete cosine transformation (IDCT) as indicated at 508. These processes may decode the headers 509 and data from macroblocks. The decoded headers 509 may be used to assist in VCL decoding of neighboring macroblocks.

According to aspects of the present invention the initially decoded headers or portions of video metadata (e.g., slice data) may be provided to the Neural Network 505 which may predict subsequent headers or portions of video metadata. The portions of video metadata may then be inserted in to the headers 509 for use in the decoding process. Additionally according to the present invention the VCL decoding process may decode an encoding error for each subsequent section from the encoded headers, the encoding error may be combined with the video metadata to correct incorrect predictions made by the Neural Network 505. The video metadata may include the aforementioned flag in the header which signals whether the encoding parameters are unaltered initial encoding parameters or a prediction error. In some implementations, the predictions from the neural network may be inserted into the headers 509.

VCL decoding 504 and Neural Network Prediction 505 may be implemented at a macroblock level data dependency frequency. Specifically, different macroblocks within the same slice may undergo VCL decoding in parallel during neural network prediction and the results may be sent to the motion vector reconstruction task group 510 for further processing.

Subsequently, all macroblocks in the picture or section may undergo motion vector reconstruction 510. The MV reconstruction process 510 may involve motion vector reconstruction 512 using headers from a given macroblock 511 and/or co-located macroblock headers 513. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered pixels may be reconstructed at 516 using a process based on residual pixels from the VCL decoding process 504 and motion vectors from the MV reconstruction process 510. The data dependency frequency (and level of parallelism) for the MV depends on whether the MV reconstruction process 510 involves co-located macroblocks from other pictures. For MV reconstruction not involving co-located MB headers from other pictures the MV reconstruction process 510 may be implemented in parallel at the slice level or picture level. For MV reconstruction involving co-located MB headers the data dependency frequency is at the picture level and the MV reconstruction process 510 may be implemented with parallelism at the slice level.

The results of motion vector reconstruction 510 are sent to the picture reconstruction task group 514, which may be parallelized on a picture frequency level. Within the picture reconstruction task group 514 all macroblocks in the picture or section may undergo pixel prediction and reconstruction 516 in conjunction with de-blocking 520. The pixel prediction and reconstruction task 516 and the de-blocking task 520 may be parallelized to enhance the efficiency of decoding. These tasks may be parallelized within the picture reconstruction task group 514 at a macroblock level based on data dependencies. For example, pixel prediction and reconstruction 516 may be performed on one macroblock and followed by de-blocking 520. Reference pixels from the decoded picture obtained by de-blocking 520 may be used in pixel prediction and reconstruction 516 on subsequent macroblocks. Pixel prediction and reconstruction 518 produces decoded sections 519 (e.g. decoded blocks or macroblocks) that include neighbor pixels which may be used as inputs to the pixel prediction and reconstruction process 518 for a subsequent macroblock. The data dependencies for pixel prediction and reconstruction 516 allow for a certain degree of parallel processing at the macroblock level for macroblocks in the same slice.

Pixel prediction may use pixels from within the current picture that is being decoded as reference pixels instead of pixels from an already decoded picture. Any reference pixels that have not been decoded may be replaced by padding pixels, which may be determined from pixels within the current picture that have already been decoded. If no pixels have been decoded, the values of the padding pixels may be determined arbitrarily as discussed above.

The post processing task group 520 may include a de-blocking filter 522 that is applied to blocks in the decoded section 519 to improve visual quality and prediction performance by smoothing the sharp edges which can form between blocks when block coding techniques are used. The de-blocking filter 522 may be used to improve the appearance of the resulting de-blocked sections 524.

The decoded section 519 or de-blocked sections 524 may provide neighboring pixels for use in de-blocking a neighboring macroblock. In addition, decoded sections 519 including sections from a currently decoding picture may provide reference pixels for pixel prediction and reconstruction 518 for subsequent macroblocks. It is during this stage that pixels from within the current picture may optionally be used for pixel prediction within that same current picture as described above, independent of whether the picture (or subsections thereof) is inter-coded or intra-coded. De-blocking 520 may be parallelized on a macroblock level for macroblocks in the same picture.

The decoded sections 519 produced before post processing 520 and the post-processed sections 524 may be stored in the same buffer, e.g., the output picture buffer depending on the particular codec involved. It is noted that de-blocking is a post processing filter in H.264. Because H.264 uses pre-de-blocking macroblock as reference for neighboring macroblocks intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

Thus, for H.264, after pixel decoding, the decoded section 519 is saved in the output picture buffer. Later, the post processed sections 524 replace the decoded sections 519 in the output picture buffer. For non-H.264 cases, the decoder only saves decoded sections 519 in the output picture buffer. The post processing is done at display time and the post processing output may not share the same buffer as the decoder output picture buffer.

For most multi-processor hardware platforms, the inter processor data access delay is shorter than the time interval between video pictures. However, only a few parallel processing engines can do inter-processor data transfer faster than the macroblock processing speed. It is acceptable to have two tasks exchange data at the picture frequency. Based on the picture frequency dependencies described above with respect to FIG. 3, it is possible to break up the decoding process 500 into five separate tasks. These tasks are A) NAL decoding 502 and decoder internal management, B) VCL syntax decoding and IQ/IDCT 504, C) motion vector reconstruction 510 and D) pixel prediction and reconstruction 516 and E) de-blocking 520.

In general, NAL decoding may be done at a picture or slice level data dependency frequency. For codecs such as AVC (H.264) the data dependencies involved in NAL decoding 302 may be fairly complex yet the overall NAL decoding process 502 may take a relatively low number of cycles. Consequently it may be more efficient to implement all NAL decoding 502 on a single processor rather than to attempt to parallelize this process. The motion vector reconstruction task 510 typically takes about one tenth as many processor cycles as for VCL syntax decoding and IQ/IDCT 504, pixel prediction and reconstruction 516 and de-blocking 520. The computational complexities of the latter three tasks are fairly similar. However, the execution cycle allocation among these three large cycle tasks is different for different coded video streams.

For some codecs, within the VCL syntax decoding and IQ/IDCT 504 there are only macroblock level data dependencies within each slice but due to the nature of Neural Network prediction there is greater dependency between slices. In some embodiments the dependencies are limited by performing second and first NN prediction within a slice boundary. This approach would dramatically limit the number of input parameters and reduce the prediction accuracy but would provide better error resilience. The motion vector reconstruction task 510 depends on the output of the VCL syntax decoding and IQ/IDCT 504 for input. The pixel prediction and reconstruction task 516 takes the outputs of the VCL syntax decoding and IQ/IDCT task 504 and motion vector reconstruction task 510 as inputs. Within the motion vector reconstruction task 510 and pixel prediction and reconstruction task 518 there are macroblock level data dependencies, but slices within one picture are independent of each other.

The pixel prediction and reconstruction task 516 may involve motion compensation. The picture dependency in the pixel prediction and reconstruction task 516 may result from such motion compensation. Motion compensation refers to adding residual pixels to reference pixels fetched by motion vectors. The input of motion compensation is motion vector and residual pixels. The output of motion compensation is decoded pixels. As discussed above, motion compensation is a process that normally uses a previously decoded picture to predict the current picture. In the motion compensation process, a two-dimensional vector, called a motion vector, is used to reference the pixels in a previously decoded picture. The picture level dependency in the motion vector reconstruction task 510 is caused by direct prediction. In direct prediction, a previously decoded macroblock's motion vector is used to calculate the current macroblock's motion vector. In an AVC decoder, the previously decoded reference picture is the output of the de-blocking task 520. Because of limitations on motion vector ranges defined by the coding standard, not all the pixels in the previous picture may be available to predict a certain macroblock in the current picture. For example, the motion vector range for an AVC level 4.1 stream is −512 to 511.75 pixels vertically and −1024 to 1023.75 pixels horizontally. If the picture size is 1920×1088 pixels, about one quarter of the pixels in the reference picture can be used for prediction of a corner macroblock. By contrast, almost all of the pixels in the reference picture can be used for prediction of a center macroblock.

Note that in the example depicted in FIG. 5, there is no dependency loop between the VCL decoding and IQ/IDCT tasks 508 and any other tasks. As such, this task may be merged into any or all of the VCL decoding task 504, motion vector reconstruction task 510 or pixel prediction and reconstruction task 516 to balance the task loads amongst available processors. Because some blocks may not have DCT coefficients, merging the IQ/IDCT task 508 into the block syntax decoding loop can allow the decoder to do IQ/IDCT only for coded blocks and reduce the number of branches. After all parameters have been reconstructed by the NN, a conventional decoding process still could be done on multiple processors in parallel. In some implementations, a NN-based parameter prediction may be done in parallel with another decoding process using pipelining.

The decoding method described above with respect to FIG. 3 may be implemented in a single thread. Alternatively, the decoding method of FIG. 3 may be implemented in multiple threads with a processing module capable of implementing parallel processing. In particular, different sections of a picture may be processed in parallel. As used herein, processing in parallel means that, to some extent, the processing of two or more different tasks overlaps in time.

Computing Device

Figure 6:
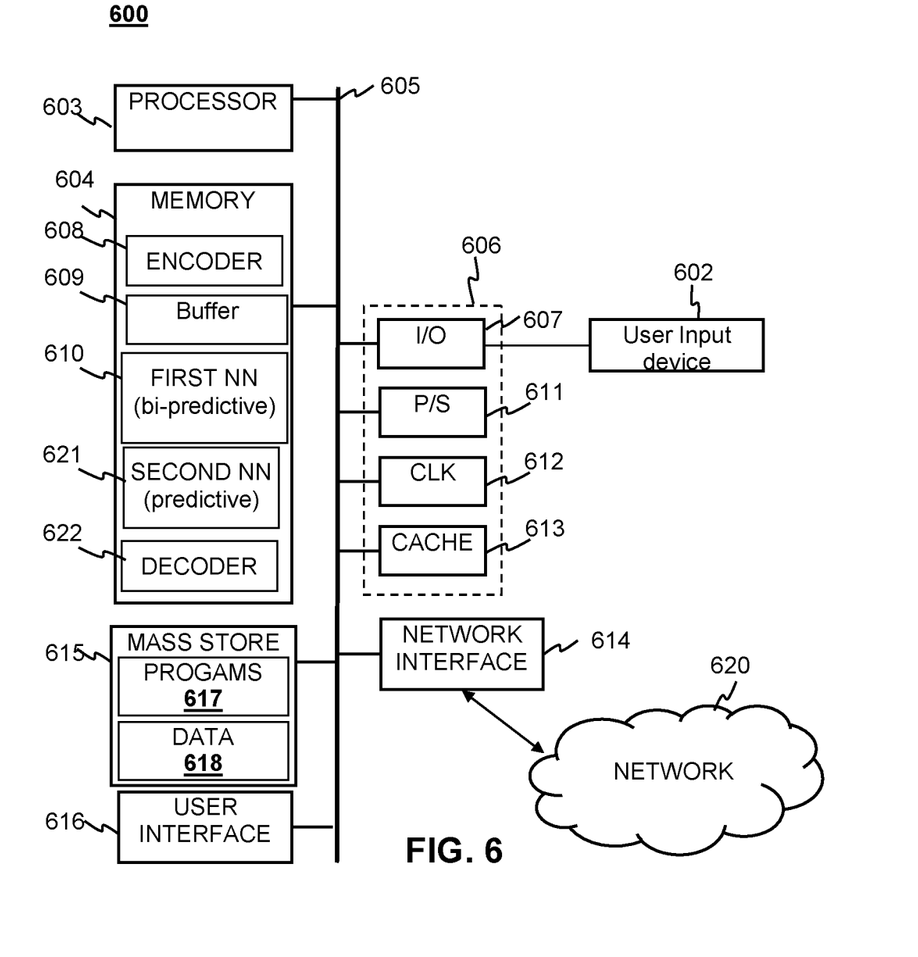
FIG. 6 is a block diagram illustrating an apparatus for neural network encoding and/or decoding a digital picture according to an embodiment of the present invention.

FIG. 6 depicts a system according to aspects of the present disclosure. The system may include a computing device 600 coupled to a user input device 602. The user input device 602 may be a controller, touch screen, microphone, keyboard, mouse, light pen, or other device that allows the user to input control data in to the system.

The computing device 600 may include one or more processor units 603, which may be configured according to well-known architectures, such as, e.g., single-core, dual-core, quad-core, multi-core, processor-coprocessor, cell processor, and the like. The computing device may also include one or more memory units 604 (e.g., random access memory (RAM), dynamic random access memory (DRAM), read-only memory (ROM), and the like).

The processor unit 603 may execute one or more programs, portions of which may be stored in the memory 604 and the processor 603 may be operatively coupled to the memory, e.g., by accessing the memory via a data bus 605. The programs may be configured to implement training of a First NN 610. Additionally the Memory 604 may contain programs that implement training of a second NN 621. The Memory 604 may also contain programs to encode 608 and/or decode video 622. The Memory 604 may also contain software modules such as a First NN Module 610 and a Second NN Module 621. The overall structure and probabilities of the NNs may also be stored as data 618 in the Mass Store 615. The processor unit 603 is further configured to execute one or more programs 617 stored in the mass store 615 or in memory 604 which cause processor to carry out the method 200 of training a first NN 610 from feature data and/or the method 300 of training a second NN. The system may generate Neural Networks as part of the NN training process. These Neural Networks may be stored in memory 604 as part of the First NN Module 621 or second NN Module 610. Completed NNs may be stored in memory 604 or as data 618 in the mass store 615. The programs 617 (or portions thereof) may also be configured, e.g., by appropriate programming, to encode, un-encoded video or decoded encoded video according to the method of FIGS. 4 and 5

The computing device 600 may also include well-known support circuits, such as input/output (I/O) 607, circuits, power supplies (P/S) 611, a clock (CLK) 612, and cache 613, which may communicate with other components of the system, e.g., via the bus 605. The computing device may include a network interface 614. The processor unit 603 and network interface 614 may be configured to implement a local area network (LAN) or personal area network (PAN), via a suitable network protocol, e.g., Bluetooth, for a PAN. The computing device may optionally include a mass storage device 615 such as a disk drive, CD-ROM drive, tape drive, flash memory, or the like, and the mass storage device may store programs and/or data. The computing device may also include a user interface 616 to facilitate interaction between the system and a user. The user interface may include a display monitor, head mounted display, 7 segment display or other device.

The computing device 600 may include a network interface 614 to facilitate communication via an electronic communications network 620. The network interface 614 may be configured to implement wired or wireless communication over local area networks and wide area networks such as the Internet. The device 600 may send and receive data and/or requests for files via one or more message packets over the network 620. Message packets sent over the network 620 may temporarily be stored in a buffer 609 in memory 604.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for training a video encoder/decoder system the method comprising:
   a) generating at least two sets of video encoding parameters wherein the at least two sets of video encoding parameters are valid;
   b) masking a set of the at least two sets of encoding parameters with invalid values to generate an invalid set of video encoding parameters;
   c) providing the at least two sets of video encoding parameters to one or more neural networks;
   d) training the one or more neural networks to predict valid values corresponding to values of the invalid set using an iterative training algorithm;
   e) determining which encoding parameters need to be encoded based on analysis of a prediction error of the one or more neural networks;
   f) dropping the encoding parameters from the encoded data which are determined to be accurately predicted by the one or more neural networks;
   g) encoding a new video stream without the dropped encoding parameters.

2. The method of claim 1, wherein the one or more neural networks include a bi-predictive neural network and a predictive neural network, wherein c) includes providing one or more parameters before a current parameter to be predicted to the predictive neural network and providing one or more parameters before the current parameter to be predicted and one or more parameters after the current parameter to be predicted to the bi-predictive neural network, wherein the one or more parameters after the current parameter to be predicted include one or more parameters predicted by the predictive neural network.

3. The method of claim 2, wherein the invalid set of video encoding parameters are for a current section, wherein d) includes iteratively training the bi-predictive neural network to predict encoding parameters for the current section using parameters before the current parameter to be predicted and after the current parameter to be predicted.

4. The method of claim 2, wherein the invalid set of video encoding parameters are for a current section, wherein d) includes iteratively training the bi-predictive neural network to predict encoding parameters for the current section using parameters for sections before and after the current section and training the predictive neural network to predict parameters for the current section using parameters for a section before the current section.

5. The method of claim 1 wherein the invalid set of encoding parameters are a single type of encoding parameter, wherein another set in the at least two sets of video encoding parameters are of at least another different encoding parameter type and wherein the one or more neural networks are trained to predict a correct set of encoding parameters from the another set of video encoding parameters using iterative training.

6. The method of claim 1 wherein a prediction error component is added to the video stream at e).

7. The method of claim 1 wherein the masked set of encoding parameters are provided to the neural network after all of the valid encoding parameters.

8. A method for video encoding the method comprising:
a) determining video encoding parameters for a section from an unencoded video stream with a video encoder;
b) providing the video encoding parameters for the section to one or more trained neural networks wherein the one or more trained neural networks are trained to predict other video encoding parameters;
c) predicting other video encoding parameters from the provided video encoding parameters with the one or more trained neural networks;
d) determining a prediction error of the predicted other video encoding parameters from the one or more neural networks and actual encoding parameters from the video encoder;
e) encoding the unencoded video stream without encoding parameters for sections that have no prediction error.

9. The method of claim 8 wherein d) further comprises encoding the prediction error for sections of the video stream that have errors in prediction.

10. The method of claim 8 wherein d) further comprises encoding the correct encoding parameter for sections of the video stream that have errors in prediction.

11. The method of claim 8 wherein the one or more trained neural networks include a predictive neural network and a bi-predictive neural network.

12. The method of claim 11 wherein c) includes providing an encoding parameter predicted by the predictive neural network as an input to the bi-predictive neural network.

13. The method of claim 8 wherein an encoding parameter for an initial section of the video stream is always encoded.

14. The method of claim 8 wherein the video parameters provided in b) and prediction made in c) are limited to within a slice boundary to remove dependencies between slices.

15. A method for decoding a video stream with a neural network comprising:
a) receiving an encoded video stream wherein the encoded video stream has video encoding parameters for at least a section in the encoded video stream;
b) extracting the video encoding parameters for the at least a section from the encoded video stream;
c) providing the at least a section video encoding parameters to one or more neural networks trained to predict other video encoding parameters;
d) predicting the other video encoding parameters from the provided video encoding parameters with the one or more neural networks;
e) decoding the video stream using the predicted video encoding parameters and the encoded video stream;
f) displaying the decoded video stream on a display.

16. The method of claim 15 wherein the one or more neural networks include a predictive neural network and a bi-predictive neural network.

17. The method of claim 16 wherein d) includes providing an encoding parameter predicted by the predictive neural network as an input to the bi-predictive neural network.

18. The method of claim 15 wherein b) further comprises extracting a prediction error from the encoded video stream.

19. The method of claim 18 wherein d) further comprises correcting the predicted video encoding parameters with the prediction error.

20. The method of claim 15 wherein the video parameters provided in b) and prediction made in c) are limited to within a slice boundary to remove dependencies between slices.

21. A system comprising:
a processor;
a neural network trained to predict parameter values;
a memory operatively coupled to the processor;
the memory having embodied thereon instructions for video encoding, the memory further including instructions to carry out a method for improved video encoding, the method comprising;
a) determining video encoding parameters for a section from an unencoded video stream with a video encoder;
b) providing the video encoding parameters to one or more trained neural networks wherein the neural network is trained to predict other video encoding parameters;
c) predicting the other video encoding parameters with the trained neural network;
d) determining a prediction error of the predicted encoding parameters from the neural network and actual encoding parameters from the video encoder;
e) encoding the unencoded video stream without encoding parameters for sections that have no prediction error.

22. The system of claim 21, wherein the one or more trained neural networks include a predictive neural network and a bi-predictive neural network.

23. The system of claim 21 wherein c) includes providing an encoding parameter predicted by the predictive neural network as an input to the bi-predictive neural network.

24. A system comprising;
a processor;

a neural network trained to predict encoding parameter values;

a memory operatively coupled to the processor;

the memory having embodied thereon instructions for video decoding, the memory further including instructions to carry out a method for improved video decoding, the method comprising;
  a) receiving an encoded video stream wherein the encoded video stream has video encoding parameters for at least a section in the encoded video stream;
  b) extracting the video encoding parameters for the at least a section from the encoded video stream;
  c) providing the video encoding parameters for the at least a section to one or more neural networks wherein the neural network is trained predict other video encoding parameters;
  d) predicting other video encoding parameters from video encoding parameters for the at least a section with the trained neural network;
  e) decoding the video stream using the predicted video encoding parameters and the encoded video stream;
  f) displaying the decoded video stream on a display.

25. The system of claim 24 wherein the one or more neural networks include a predictive neural network and a bi-predictive neural network.

26. The system of claim 25 wherein d) includes providing an encoding parameter predicted by the predictive neural network as an input to the bi-predictive neural network.

27. The system of claim 24 wherein b) further comprises extracting a prediction error from the encoded video stream and d) further comprises correcting the predicted next section video encoding parameters with the prediction error.

* * * * *